(12) United States Patent
Tang et al.

(10) Patent No.: US 10,992,214 B2
(45) Date of Patent: Apr. 27, 2021

(54) LINEAR VIBRATION MOTOR

(71) Applicant: AAC Acoustic Technologies (Shenzhen) Co., Ltd., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 99 days.

(21) Appl. No.: 16/526,934

(22) Filed: Jul. 30, 2019

(65) Prior Publication Data
US 2020/0044526 A1 Feb. 6, 2020

(30) Foreign Application Priority Data

Aug. 3, 2018 (CN) .......................... 201821252330.X (51) Int. Cl.
*H02K 33/02* (2006.01)
*H02K 33/18* (2006.01)
*H02K 1/34* (2006.01)

(52) U.S. Cl.
CPC ............... *H02K 33/02* (2013.01); *H02K 1/34* (2013.01); *H02K 33/18* (2013.01)

(58) Field of Classification Search
CPC .......... H02K 1/34; H02K 33/02; H02K 33/16; H02K 33/18
USPC .......................................................... 310/15
See application file for complete search history.

(56) References Cited

U.S. PATENT DOCUMENTS

| 6,747,631 | B1* | 6/2004 | Sakamaki | ................ | G01L 1/14 |
| | | | | | 345/157 |
| 8,269,379 | B2* | 9/2012 | Dong | ..................... | H02K 33/16 |
| | | | | | 310/25 |
| 10,090,745 | B2* | 10/2018 | Wang | ..................... | H02K 33/16 |
| 10,763,732 | B2* | 9/2020 | Liu | ........................ | H02K 33/02 |
| 2011/0001365 | A1* | 1/2011 | Park | ....................... | H02K 33/16 |
| | | | | | 310/17 |
| 2011/0062804 | A1* | 3/2011 | Lee | ........................ | H02K 33/18 |
| | | | | | 310/30 |
| 2011/0198949 | A1* | 8/2011 | Furuich | ................. | H02K 33/16 |
| | | | | | 310/25 |

(Continued)

FOREIGN PATENT DOCUMENTS

| JP | 2002010612 A | * | 1/2002 | ............. H01F 7/081 |
| JP | 2017018934 A | * | 1/2017 | ............. H02K 33/16 |

(Continued)

*Primary Examiner* — Alex W Mok
(74) *Attorney, Agent, or Firm* — W&G Law Group LLP (57) ABSTRACT

A linear vibration motor includes: a housing having a receiving space; a vibrator unit received in the housing; and a stator configured to drive the vibrator unit to vibrate. The vibrator unit includes at least two vibrators arranged along a vibrating direction and spaced apart from each other. Two adjacent vibrators of the at least two vibrators are connected by an elastic holder; the elastic holder includes a first fixed portion, two second fixed portions respectively located at two sides of the first fixed portion, and two deformation portions connecting the first fixed portion with the second fixed portion; the first fixed portion is fixed to the housing; and the two second fixed portions are respectively fixed to the two adjacent vibrators. The linear vibration motor can provide rigidity support to the vibrators.

20 Claims, 6 Drawing Sheets

(56) References Cited

U.S. PATENT DOCUMENTS

| | | | | |
|---|---|---|---|---|
| 2011/0204732 A1* | 8/2011 | Miyamoto | | H02K 33/16 310/25 |
| 2013/0193779 A1* | 8/2013 | Kuroda | | H02K 33/16 310/15 |
| 2014/0084710 A1* | 3/2014 | Endo | | B06B 1/045 310/25 |
| 2015/0207392 A1* | 7/2015 | Iwakura | | H04R 11/02 310/25 |
| 2016/0013710 A1* | 1/2016 | Dong | | H02K 33/16 310/25 |
| 2016/0226363 A1* | 8/2016 | Mao | | H02K 33/16 |
| 2017/0012516 A1* | 1/2017 | Xu | | H02K 11/30 |
| 2017/0012518 A1* | 1/2017 | Wang | | H02K 33/16 |
| 2017/0033663 A1* | 2/2017 | Wang | | H02K 33/12 |
| 2017/0033673 A1* | 2/2017 | Wang | | H02K 33/16 |
| 2017/0070132 A1* | 3/2017 | Wang | | H02K 33/16 |
| 2017/0144191 A1* | 5/2017 | Mao | | B06B 1/045 |
| 2018/0026514 A1* | 1/2018 | Mao | | H02K 5/04 310/12.16 |
| 2018/0111163 A1* | 4/2018 | Xu | | B06B 1/045 |
| 2018/0342937 A1* | 11/2018 | Mao | | H02K 33/02 |
| 2018/0358879 A1* | 12/2018 | Liu | | H02K 33/18 |
| 2019/0157958 A1* | 5/2019 | Mao | | H02K 33/12 |

FOREIGN PATENT DOCUMENTS

| | | | | | |
|---|---|---|---|---|---|
| JP | 2017035650 A | * | 2/2017 | | H02K 33/16 |
| JP | 2018137920 A | * | 8/2018 | | B06B 1/045 |

* cited by examiner

LINEAR VIBRATION MOTOR

TECHNICAL FIELD

The present disclosure relates to the field of vibration motor technologies, and in particular to, a linear vibration motor for portable consumer electronic products.

BACKGROUND

With development of the electronic technology, portable consumer electronic products, such as mobile phones, hand-held game machines, navigation devices and hand-held multimedia entertainment devices, are becoming more and more popular. In these electronic products, vibration motors are generally used for system feedback, such as call notification of the mobile phone, message notification, navigation notification and vibration feedback of the game machine.

At present, the existing linear vibration motor has only one resonant frequency. With the increasing importance of the tactile feedback technology, a single resonant frequency cannot satisfy the increasingly demand for vibration. In order to meet the demand for a multi-resonant frequency, the linear vibration motor in the related art includes at least two vibrators that are sequentially provided in the vibrating direction and spaced apart from each other. Two adjacent vibrators are connected by a spring. However, in this configuration, the spring cannot provide a rigidity support to the vibrator.

Therefore, it is necessary to provide a new linear vibration motor to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

As shown in FIGS. 1 to 6, a linear vibration motor 100 includes a housing 1, a vibrator unit 2, a stator 3, and an elastic support 4. The housing 1 has a receiving space. The vibrator unit 2 is received in the housing 1. The stator 3 is configured to drive the vibrator unit 2 to vibrate. The elastic support 4 supports the vibrator unit 2.

The housing 1 has an elongated shape. Two ends of the housing 1 along a long axis direction are respectively fixedly provided with the elastic support 4 supporting the vibrator unit 2. The vibrator unit 2 is suspended in the housing 1 by the elastic support 4. The vibrator unit 2 vibrates along the long axis direction of the housing 1.

The housing 1 includes a shell 11 and a cover 13. The cover 13 is assembled with the shell 11 to form the receiving space.

The shell 11 includes a bottom wall 111 and a side wall 113. The side wall 113 is bent and extends from a periphery of the bottom wall 111. The cover 13 covers and is connected to the side wall 113.

The stator 3 includes a coil 31 fixed to the cover 13. The stator 3 may further include a soft magnet fixedly provided on the cover 13. The coil 31 is fixedly provided at a side of the soft magnet facing away from the cover 13.

The vibrator unit 2 includes at least two vibrators 21 arranged in the vibrating direction and spaced apart from each other. Two adjacent vibrators 21 are connected by an elastic holder 5.

The vibrator 21 includes a balancing weight 23 and a magnet 25. The magnet 25 is fixedly provided on the balancing weight 23. The elastic holder 5 is fixed to the balancing weight 23. In an example, the balancing weight 23 is provided with a receiving hole 231 passing therethrough. The magnet 25 is provided in the receiving hole 231. When the coil 31 is energized, the coil 31 drives the vibrator 21 to vibrate by a counterforce of the Lorentz force. In this embodiment, the coil 31 faces right towards and is spaced apart from the magnet 25.

The magnet 25 includes a plurality of first magnet portions 251 spaced apart from each other and a second magnet portion 253 sandwiched between two adjacent first magnet portions 251. The second magnet portions 253 are symmetrically arranged about a central axis of the coil 31. The first magnet portion 251 is a permanent magnet. The second magnet portion 253 may be a permanent magnet having a magnetizing direction opposite to the magnetizing direction of the first magnet portion 251, or may be a magnetizer made of a magnetic conductive material. The magnetizer acts as a magnetic conductor. With such a magnet structure, the magnetic induction line of the magnetic field formed by the magnet 25 passes through the coil to a maximum extent, thereby improving the electromagnetic induction efficiency. The magnet 25 can also be a magnet in one piece.

The vibrator 21 further includes a pole plate 27. The pole plate 27 is fixedly provided at a side of the balancing weight 23 facing away from the stator 3 and covers the magnet 25. The arrangement of the pole plates 27 can converge magnetic induction lines diverged by the magnet 25 so as to increase the magnetic induction intensity.

In other embodiments, positions of the coil 31 and the magnet 25 may be interchanged, that is, the stator 3 includes a magnet, and the vibrator 21 includes a balancing weight 23 and a coil fixedly provided on the balancing weight 23. Meanwhile, the number and shape of the receiving holes on the balancing weight 23 change correspondingly.

Figure 1:
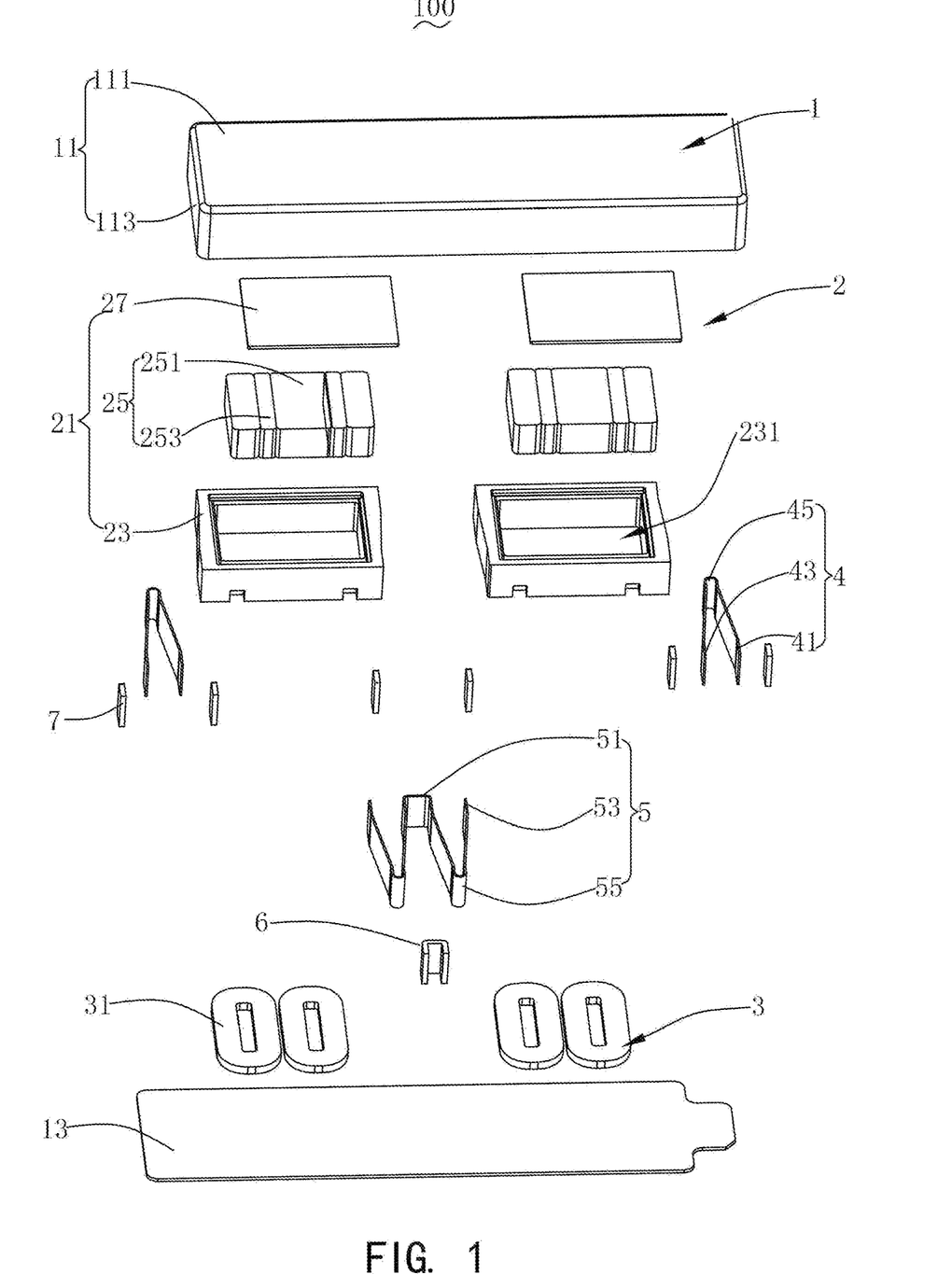
FIG. 1 is a perspective exploded view of a linear vibration motor according to an embodiment of the present disclosure.
Figure 5:
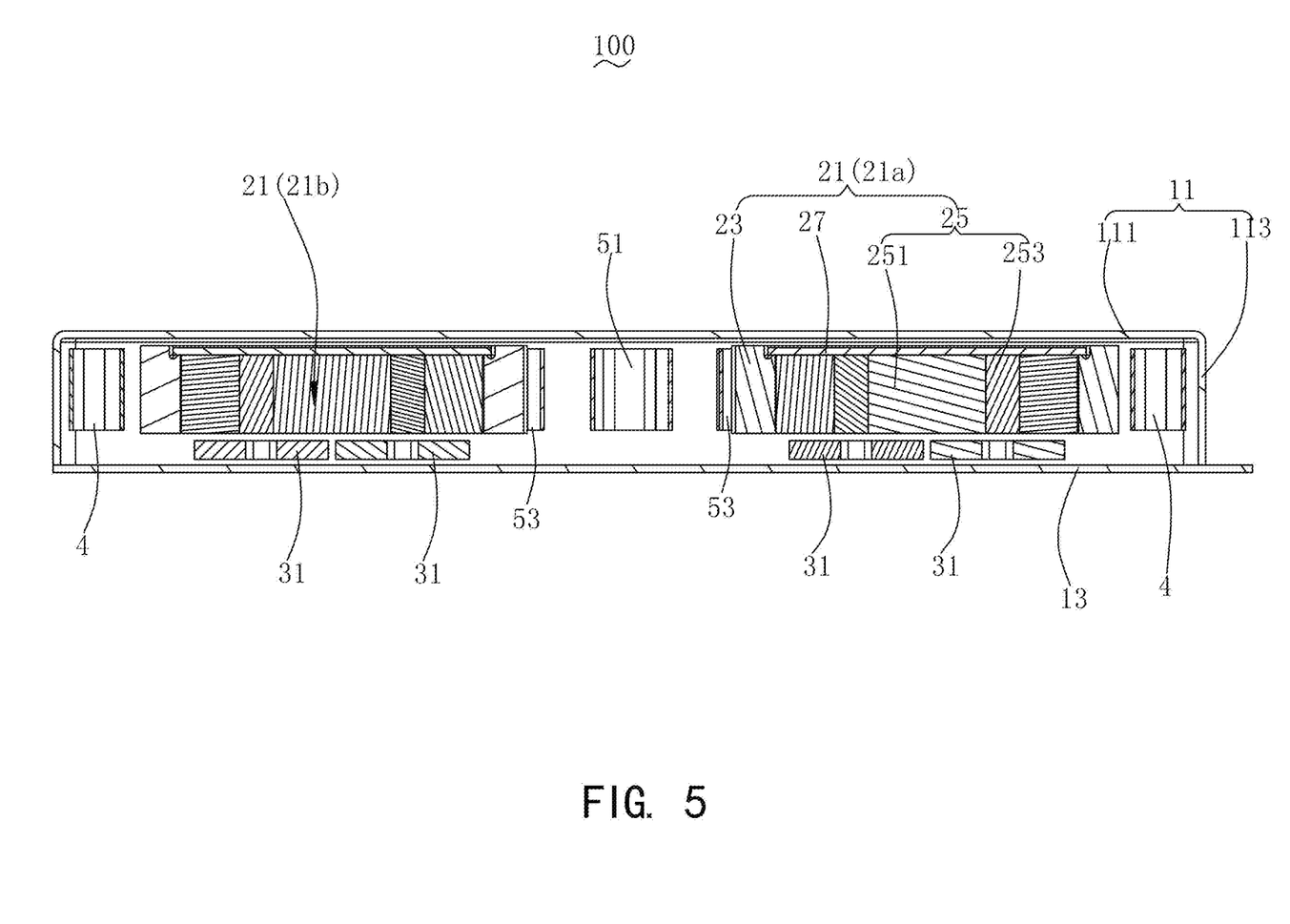
FIG. 5 is a cross-sectional view of the linear vibration motor of FIG. 4 taken along line A-A.
Figure 6:
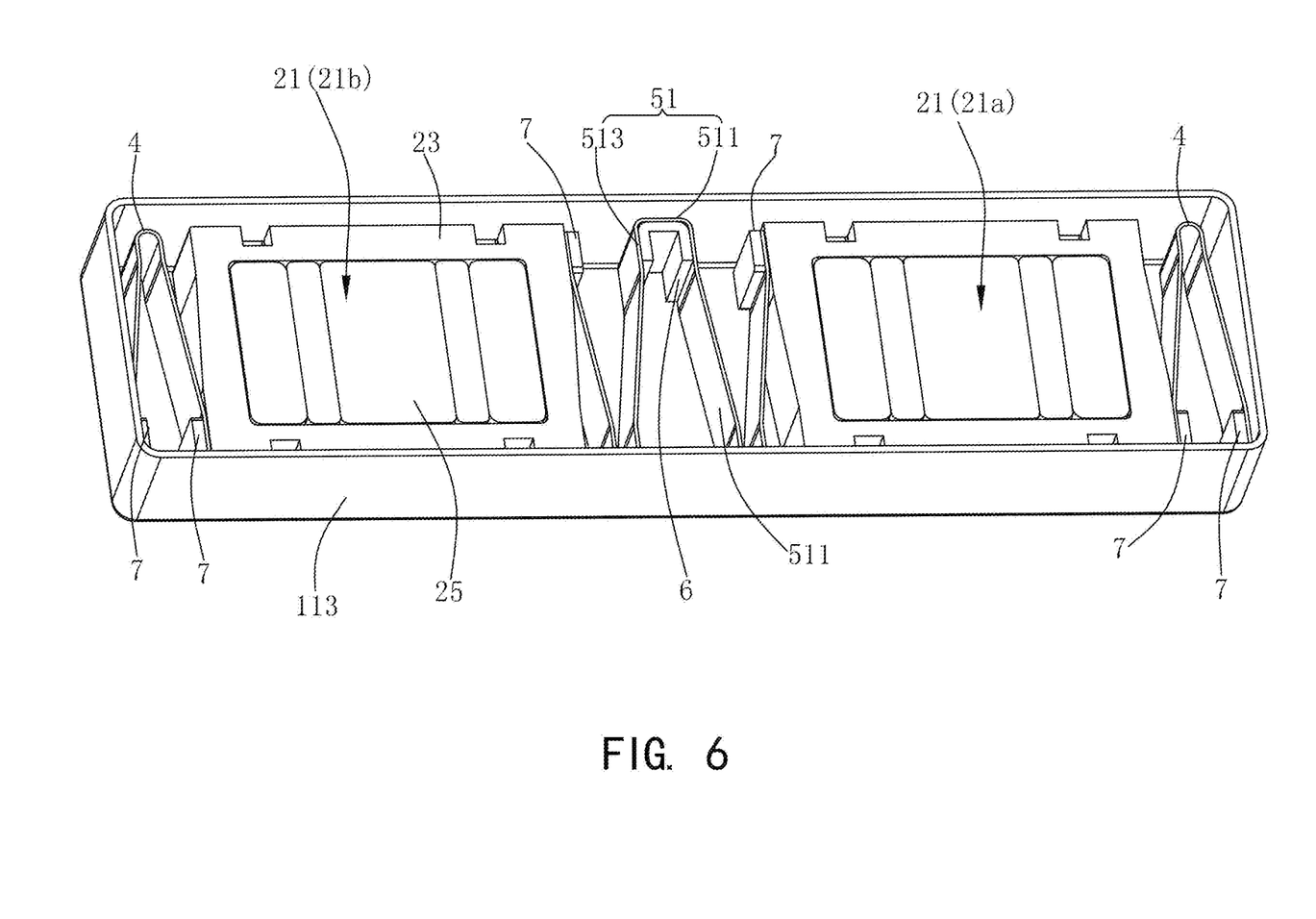
FIG. 6 is a perspective view showing a partial structure of the linear vibration motor shown in FIG. 1 after being assembled.

In order to make the technical solutions of the present disclosure clearly understand by those skilled in the art, the vibrator unit 2 includes two vibrators 21 (as shown in FIGS. 1, 5 and 6) which are a first vibrator 21a and a second vibrator 21b.

The elastic holder 5 includes a first fixed portion 51, two second fixed portions 53 respectively located at two sides of the first fixed portion 51, and two deformation portions 55 connecting the first fixed portion 51 with the second fixed portion 53. The housing 1 is fixed to the first fixed portion 51. The two second fixed portions 53 are respectively fixed to the balancing weight 23 of the first vibrator 21a and the balancing weight 23 of the second vibrator 21b. In this embodiment, the first fixed portion 51 is fixed to the side wall 113 of the housing 1. In other embodiments, the first fixed portion 51 may also be fixed to the bottom wall 111 or the cover 13.

Figure 2:
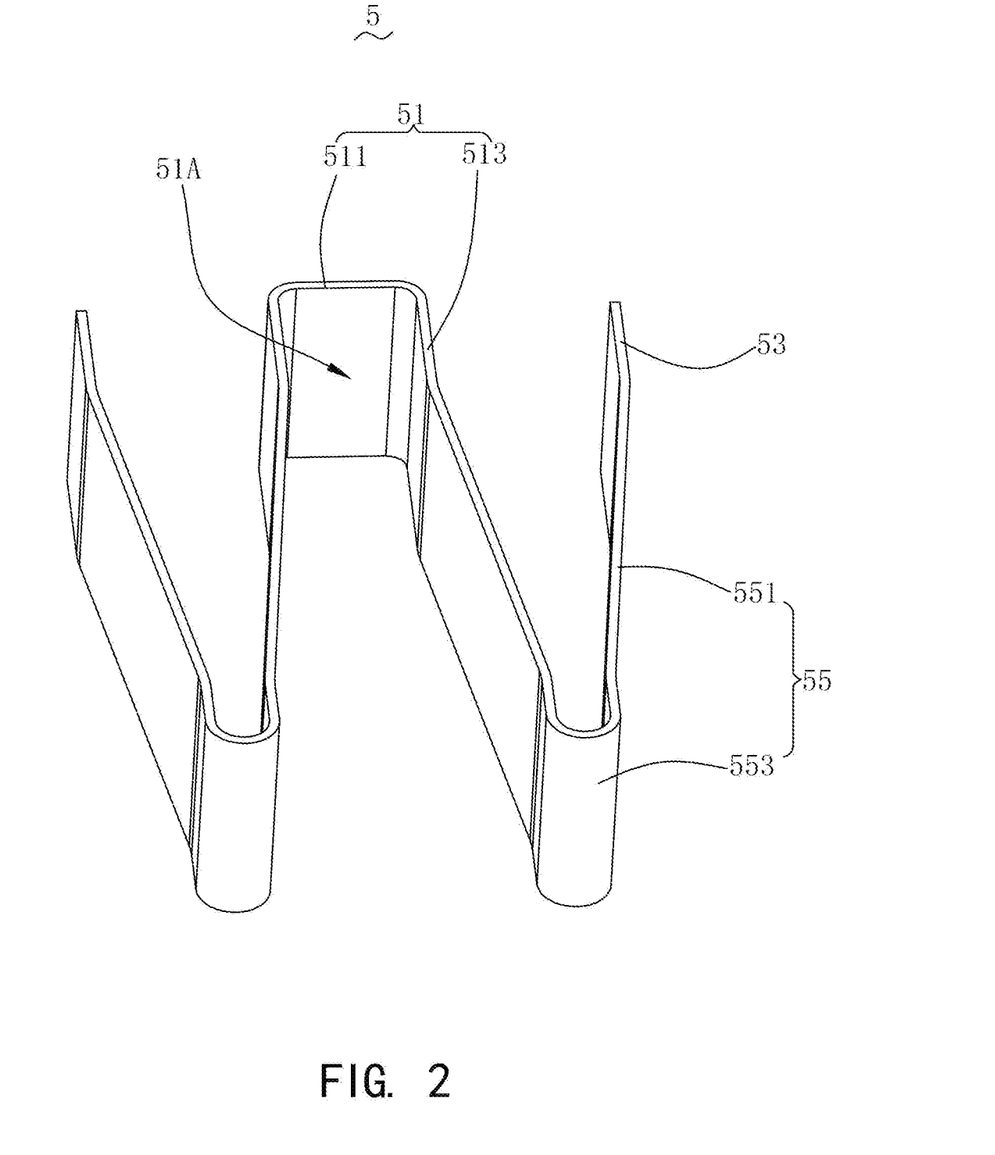
FIG. 2 is a perspective view of an elastic holder in the linear vibration motor shown in FIG. 1.
Figure 3:
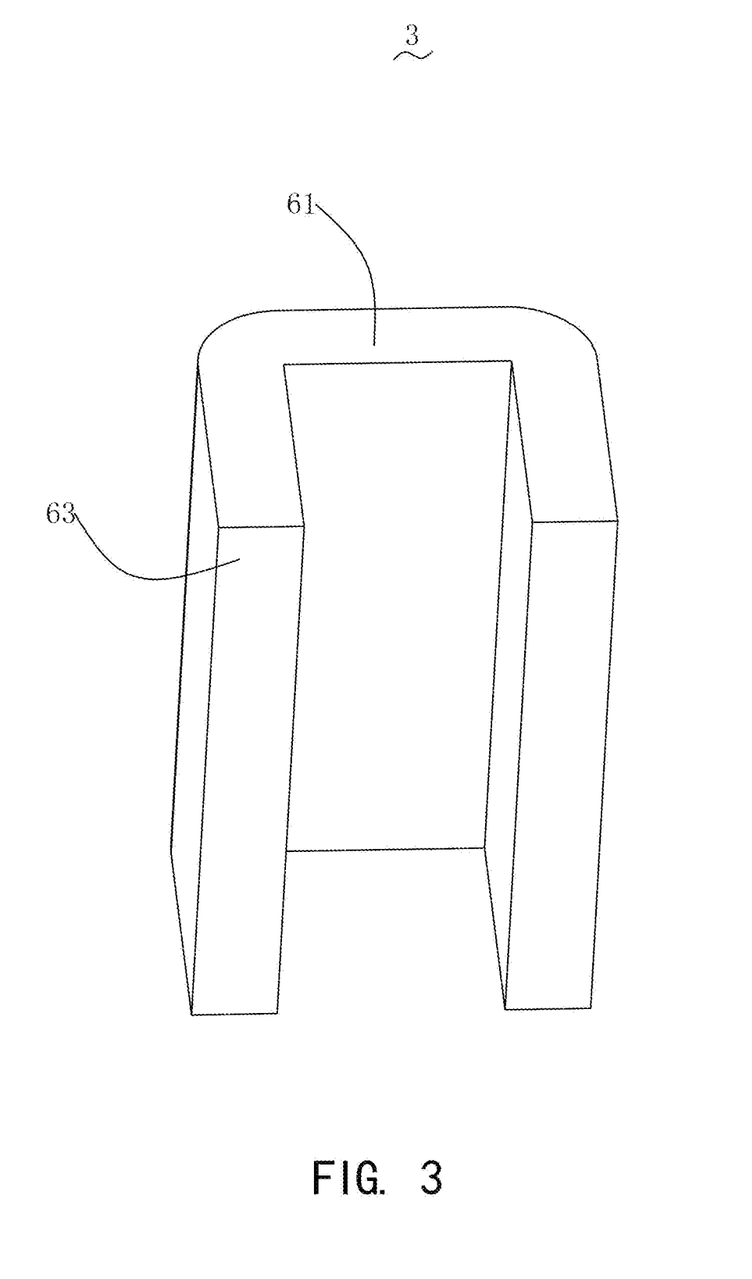
FIG. 3 is a perspective view of a fixing member in the linear vibration motor shown in FIG. 1.
Figure 4:
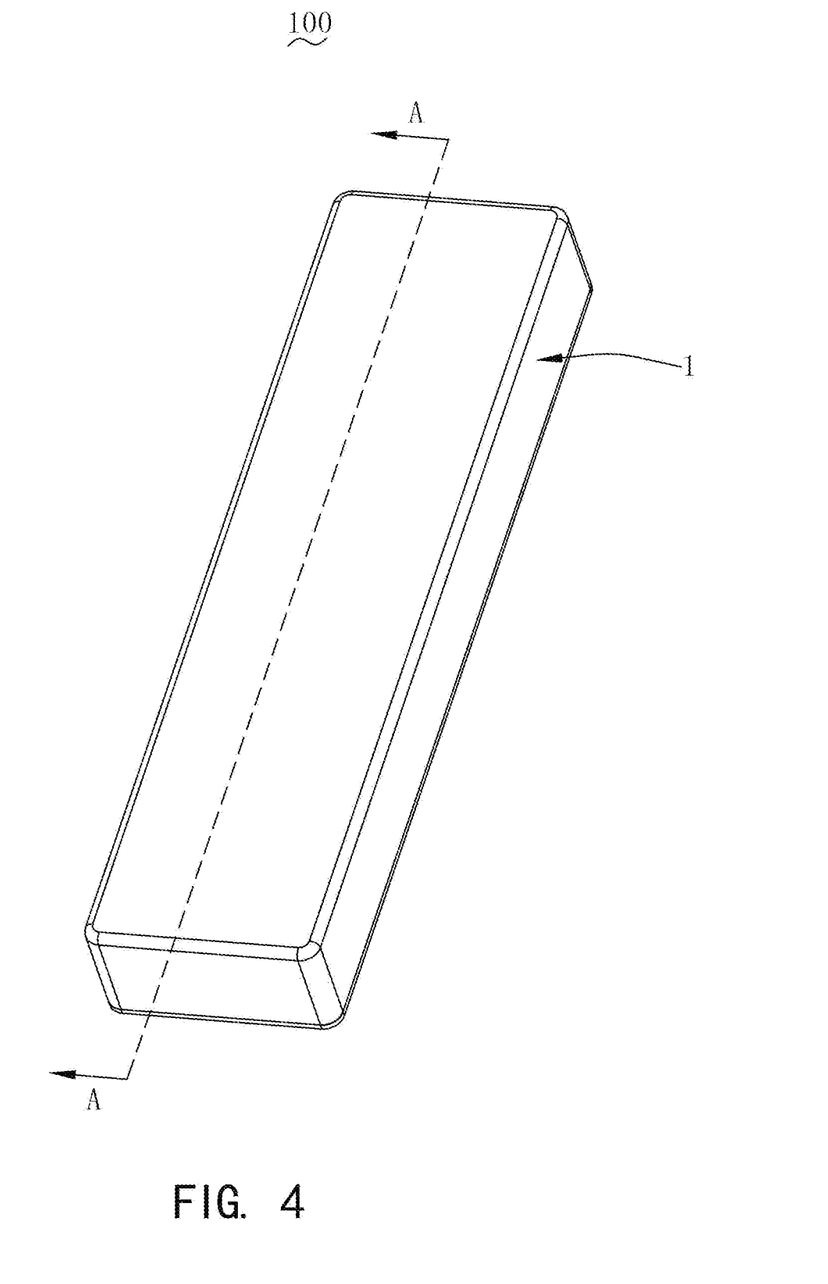
FIG. 4 is a perspective view of the linear vibration motor shown in FIG. 1 after being assembled.

As shown in FIGS. 1, 2 and 6, the elastic holder 5 is in an axisymmetric structure having a symmetry axis perpendicular to the vibrating direction. The elastic holder 5 is formed in one piece.

The first fixed portion 51 is fixed to the housing 1 by a fixing member 6.

The first fixed portion 51 includes a fixed plate 511 and a side plate 513. The fixed plate 51 abuts against the housing 1. The side plate 513 is formed by extending from two opposite sides of the fixed plate 511 in the vibrating direction while being bent into the receiving space. The fixed plate 511 and the side plate 513 are connected to form a receiving groove 51A. The fixing member 6 is provided in the receiving groove 51A. The side plate 513 is connected to the deformation portion 55. As shown in FIGS. 2 and 6, the fixed plate 511 is perpendicular to the side plate 513, and there is a rounded corner at a position where the fixed plate 511 and the side plate 513 are connected.

The fixing member 6 is welded and fixed to the housing 1 and the first fixed portion 51, so that the fixed plate 511 is fixed between the fixing member 6 and the housing 1, thereby achieving fixing the first fixed portion 51 to the housing 1.

The fixing member 6 includes a first wall 61 and a second wall 63. The first wall 61 is connected to the fixed plate 511. The second wall 63 extends from two opposite sides of the first wall 61 along the vibrating direction while being bent in a direction facing away from the fixed plate 511. The second wall 63 abuts against the side plate 513. At least the first wall 61 of the first wall 61 and the second wall 63 is welded to the housing 1. In this embodiment, both the first wall 61 and the second wall 63 are welded to the housing 1, so that the fixation strength of the fixed plate 511 can be ensured.

According to an embodiment of the present disclosure, a damping gasket 7 is provided at a side of the second fixed portion 53 facing away from the vibrator 21. The damping gasket 7 is made of an elastic material such as foam, rubber or silica gel. The arrangement of the damping gasket 7 can buffer the collision occurring when the deformation portion 55 is being deformed.

The deformation portion 55 includes at least two elastic arms 551 and a bent portion 553 connecting two adjacent elastic arms 551. The two elastic arms 551 of the deformation portion 55 on opposite sides along the vibrating direction are respectively fixed to the first fixed portion 51 and the second fixed portion 53. As shown in FIG. 2, as one embodiment, two elastic arms 551 and one bent portion 553 are provided. The number of the elastic arms 551 may also be N (N is an integer greater than or equal to 3), and the number of the bent portions 553 is N−1. When the number of the bent portions 553 is N−1, an opening of the N−2$^{th}$ bent portion 553 is opposite to an opening of the N−1$^{th}$ bent portion 553. It should be noted that the number of the elastic arms 551 and the number of the bent portions 553 are not infinite, and are preferably two.

The bent portion 553 has an arc structure. The arc structure can reduce the stress generated at the bent portion 553 when the deformation portion 55 is being deformed, so that the life of the bent portion 553 can be prolonged.

According to another embodiment of the deformation portion 55, the deformation portion 55 may also be only a self-elastic arm, two ends of which are respectively fixed to the first fixed portion 51 and the second fixed portion 53.

It should be noted that, in other embodiments, the elastic holder 5 may also be in a non-axisymmetric structure. In an example, the two deformation portions 55 are asymmetric in structure. For example, one of the two deformation portions 55 is an elastic arm; and the other of the two deformation portions 55 includes two elastic arms and two bent portions of the elastic arms. The elastic holder 5 is formed by welding among the first fixed portion, the second fixed portion and the deformation portion.

The elastic support 4 is a V-shape spring, and includes a first connection portion 41 fixed to the side wall 113, a second connection portion 43 fixed to the balancing weight 51, and an elastic portion 45 connecting the first connection portion 41 with the second connection portion 43. In other embodiments, the elastic support 4 can also take a U-shape spring.

In this embodiment, a damping gasket 7 is provided on a surface of the first connection portion 41 and a surface of the second connection portion 43 that face each other.

With the linear vibration motor 100 provided by the present disclosure, the elastic holder 5 includes the first fixed portion 51, two second fixed portions 53 respectively located at two sides of the first fixed portion 51, and two deformation portions 55 connecting the first fixed portion 51 and the second fixed portion 53. The housing 1 is fixed to the first fixed portion 51; and the two second fixed portions 53 are respectively fixed to two adjacent vibrators 21. In this way, the elastic holder 5 can provide rigidity support to the vibrator 21.

The above are only preferred embodiments of the present disclosure. Here, it should be noted that those skilled in the art can make modifications without departing from the inventive concept of the present disclosure, but these shall fall into the protection scope of the present disclosure.

What is claimed is:

1. A linear vibration motor, comprising:
a housing having a receiving space;
a vibrator unit received in the housing; and
a stator configured to drive the vibrator unit to vibrate,
wherein the vibrator unit comprises at least two vibrators arranged along a vibrating direction and spaced apart from each other, and
two adjacent vibrators of the at least two vibrators are connected by an elastic holder; the elastic holder comprises a first fixed portion, two second fixed portions respectively located at two sides of the first fixed portion, and two deformation portions connecting the first fixed portion with the second fixed portion; the first fixed portion is fixed to the housing; and the two second fixed portions are respectively fixed to the two adjacent vibrators.

2. The linear vibration motor as described in claim 1, wherein the first fixed portion is fixed to the housing by a fixing member.

3. The linear vibration motor as described in claim 2, wherein the first fixed portion comprises a fixed plate and a side plate; the fixed plate abuts against the housing; the side plate is formed by extending from two opposite sides of the fixed plate in the vibrating direction while being bent into the receiving space; the fixed plate and the side plate are connected to form a receiving groove; the fixing member is provided in the receiving groove; and the side plate is connected to the deformation portion.

4. The linear vibration motor as described in claim 3, wherein the fixing member is welded and fixed to the housing such that the fixed plate is fixed between the fixing member and the housing.

5. The linear vibration motor as described in claim 4, wherein the fixing member comprises a first wall and a second wall; the first wall is connected to the fixed plate; the second wall extends from two opposite sides of the first wall along the vibrating direction while being bent in a direction facing away from the fixed plate; the second wall abuts against the side plate; and at least the first wall of the first wall and the second wall is welded to the housing.

6. The linear vibration motor as described in claim 5, wherein the elastic holder is formed in one piece.

7. The linear vibration motor as described in claim 5, wherein the elastic support is in an axisymmetric structure having a symmetry axis perpendicular to the vibrating direction.

8. The linear vibration motor as described in claim 4, wherein the elastic holder is formed in one piece.

9. The linear vibration motor as described in claim 4, wherein the elastic support is in an axisymmetric structure having a symmetry axis perpendicular to the vibrating direction.

10. The linear vibration motor as described in claim 3, wherein the elastic holder is formed in one piece.

11. The linear vibration motor as described in claim 3, wherein the elastic support is in an axisymmetric structure having a symmetry axis perpendicular to the vibrating direction.

12. The linear vibration motor as described in claim 2, wherein the elastic holder is formed in one piece.

13. The linear vibration motor as described in claim 2, wherein the elastic support is in an axisymmetric structure having a symmetry axis perpendicular to the vibrating direction.

14. The linear vibration motor as described in claim 1, wherein a damping gasket is provided at a side of the second fixed portion facing away from the vibrator.

15. The linear vibration motor as described in claim 14, wherein the elastic holder is formed in one piece.

16. The linear vibration motor as described in claim 14, wherein the elastic support is in an axisymmetric structure having a symmetry axis perpendicular to the vibrating direction.

17. The linear vibration motor as described in claim 1, wherein one of the vibrator and the stator comprises a coil, and the other of the vibrator and the stator comprises a magnet, the vibrator further comprises a balancing weight; and in the vibrator, the coil or the magnet is fixedly provided on the balancing weight, and the second fixed portion is fixed on the balancing weight.

18. The linear vibration motor as described in claim 1, wherein the deformation portion comprises at least two elastic arms and a bent portion connecting two adjacent elastic arms of the at least two elastic arms, and two elastic arms of the at least two elastic arms at opposite sides along the vibrating direction are fixed to the first fixed portion and the second fixed portion, respectively.

19. The linear vibration motor as described in claim 1, wherein the elastic holder is formed in one piece.

20. The linear vibration motor as described in claim 1, wherein the elastic support is in an axisymmetric structure having a symmetry axis perpendicular to the vibrating direction.

* * * * *